United States Patent
Cui et al.

(10) Patent No.: US 12,348,996 B2
(45) Date of Patent: Jul. 1, 2025

(54) MEASUREMENT GAP BASED CARRIER-SPECIFIC SCALING FACTOR ENHANCEMENT

(71) Applicant: Apple Inc., Cupertino, CA (US)

(72) Inventors: Jie Cui, San Jose, CA (US); Yushu Zhang, Beijing (CN); Yang Tang, San Jose, CA (US); Dawei Zhang, Saratoga, CA (US); Hong He, San Jose, CA (US); Manasa Raghavan, Sunnyvale, CA (US); Huaning Niu, San Jose, CA (US); Haitong Sun, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 663 days.

(21) Appl. No.: 17/442,549

(22) PCT Filed: Oct. 22, 2020

(86) PCT No.: PCT/CN2020/122880
§ 371 (c)(1),
(2) Date: Sep. 23, 2021

(87) PCT Pub. No.: WO2022/082624
PCT Pub. Date: Apr. 8, 2022

(65) Prior Publication Data
US 2022/0312245 A1     Sep. 29, 2022

(51) Int. Cl.
*H04W 4/00*       (2018.01)
*H04B 17/318*     (2015.01)
*H04W 24/10*      (2009.01)
*H04W 56/00*      (2009.01)
*H04W 76/15*      (2018.01)

(52) U.S. Cl.
CPC .......... *H04W 24/10* (2013.01); *H04B 17/318* (2015.01); *H04W 56/001* (2013.01); *H04W 76/15* (2018.02)

(58) Field of Classification Search
None
See application file for complete search history.

(56) References Cited

U.S. PATENT DOCUMENTS

| | | | | |
|---|---|---|---|---|
| 10,959,104 B2 * | 3/2021 | Hapsari | ................ | H04W 24/10 |
| 11,102,669 B2 * | 8/2021 | Tsuboi | ................ | H04W 24/10 |
| 2015/0201343 A1 * | 7/2015 | Jung | .................... | H04W 24/10 |
| | | | | 370/252 |

(Continued)

FOREIGN PATENT DOCUMENTS

| | | |
|---|---|---|
| CN | 111148146 | 5/2020 |
| WO | 2020033688 A1 | 2/2020 |

OTHER PUBLICATIONS

Discussion on CSI-RS Based L3 Measurement Requirements, TSG-RAN WG4 Meeting #94-e-Bis, R4-2004292, Apr. 30, 2020, 5 pages.

(Continued)

*Primary Examiner* — Bob A Phunkulh
(74) *Attorney, Agent, or Firm* — Kilpatrick Townsend & Stockton LLP

(57) ABSTRACT

The present application relates to devices and components including apparatus, systems, and methods for measurement gap—based carrier-specific scaling factor determination in dual connectivity networks.

20 Claims, 9 Drawing Sheets

(56) References Cited

U.S. PATENT DOCUMENTS

| | | | | |
|---|---|---|---|---|
| 2016/0036541 | A1* | 2/2016 | Siomina | H04W 24/10 |
| | | | | 455/422.1 |
| 2018/0309628 | A1* | 10/2018 | Wu | H04W 76/27 |
| 2018/0324617 | A1* | 11/2018 | Schmidt | H04W 24/08 |
| 2019/0069325 | A1* | 2/2019 | Yerramalli | H04L 5/00 |
| 2019/0306734 | A1* | 10/2019 | Huang | H04W 24/08 |
| 2020/0359251 | A1* | 11/2020 | Gunnarsson | H04W 24/10 |
| 2020/0383022 | A1* | 12/2020 | Shrestha | H04W 76/27 |
| 2021/0014751 | A1* | 1/2021 | Callender | H04W 72/0446 |
| 2021/0037502 | A1* | 2/2021 | Tsai | H04L 5/0053 |
| 2021/0282001 | A1* | 9/2021 | Saber | H04W 72/23 |
| 2021/0297970 | A1* | 9/2021 | Tang | H04B 17/24 |
| 2021/0306893 | A1* | 9/2021 | Zhang | H04W 36/0088 |
| 2022/0377651 | A1* | 11/2022 | Cui | H04W 8/22 |
| 2023/0389010 | A1* | 11/2023 | Guo | H04W 72/56 |

OTHER PUBLICATIONS

Impact of Positioning on Existing RRM Requirements, 3GPP TSG-RAN WG4 Meeting #96-e, R4-2011162, Aug. 28, 2020, 6 pages.
Inter-Frequency Measurement Requirement Without Gap, 3GPP TSG-RAN WG4 Meeting #92bis, R4-1910819, Oct. 18, 2019, 3 pages.
International Patent Application No. PCT/CN2020/122880, International Search Report and Written Opinion, Mailed on Jul. 14, 2021, 10 pages.
Further discussion on CSSF for R15 EN-DC, 3GPP TSG-RAN4 Meeting #98-e, R4-2100172, Jan. 25-Feb. 5, 2021, 7 pages.
3rd Generation Partnership Project; Technical Specification Group Radio Access Network; NR; Requirements for support of radio resource management (Release 15), 3GPP TS 38.133 V15.11.0, Sep. 2020, 1198 pages.
3rd Generation Partnership Project; Technical Specification Group Radio Access Network; NR; Requirements for support of radio resource management (Release 16), 3GPP TS 38.133 V16.5.0, Sep. 2020, 1608 pages.
International Patent Application No. PCT/CN2020/122880, International Preliminary Report on Patentability, May 4, 2023, 7 pages.
3 Generation Partnership Project Technical Specification 38.133, V16.5.0, 3rd Generation Partnership Project; Technical Specification Group Radio Access Network; NR; Requirements for Support of Radio Resource Management (Release 16), vol. RAN WG4, No. V16.5.0, Oct. 9, 2020, 1608 pages.
CR on Carrier-specific Scaling Factor for CSI-RS Measurements, MediaTek inc., 3GPP TSG-RAN4 Meeting #95-e, R4-2009010, May 25-Jun. 5, 2020, 12 pages.
On CSSF for R15 EN-DC, Apple, 3GPP TSG-RAN4 Meeting #97-e, R4-2014273, Nov. 2-13, 2020, 6 pages.
Japan Patent Application No. 2023-524782, Office Action, Feb. 26, 2024, 8 pages.
European Patent Application No. 20958206.3, Partial Supplementary European Search Report, Jul. 24, 2024, 18 pages.
European Patent Application No. 20958206.3, Extended European Search Report, Mailed on Oct. 16, 2024, 17 pages.
European Patent Application No. 24200760.7, Extended European Search Report, Mailed on Dec. 18, 2024, 12 pages.

* cited by examiner

MEASUREMENT GAP BASED CARRIER-SPECIFIC SCALING FACTOR ENHANCEMENT

CROSS REFERENCES TO RELATED APPLICATIONS

This application is the U.S. National Phase of PCT Application No. PCT/CN2020/122880, filed Oct. 22, 2020, the disclosure of which is incorporated by reference in its entirety.

BACKGROUND

Third Generation Partnership Project (3GPP) Technical Specifications (TSs) define standards for wireless networks. These TSs includes numerous details relating to dual connectivity (DC) operation in which a user equipment may be provided radio resources from a plurality of base stations.

DETAILED DESCRIPTION

Figure 1:
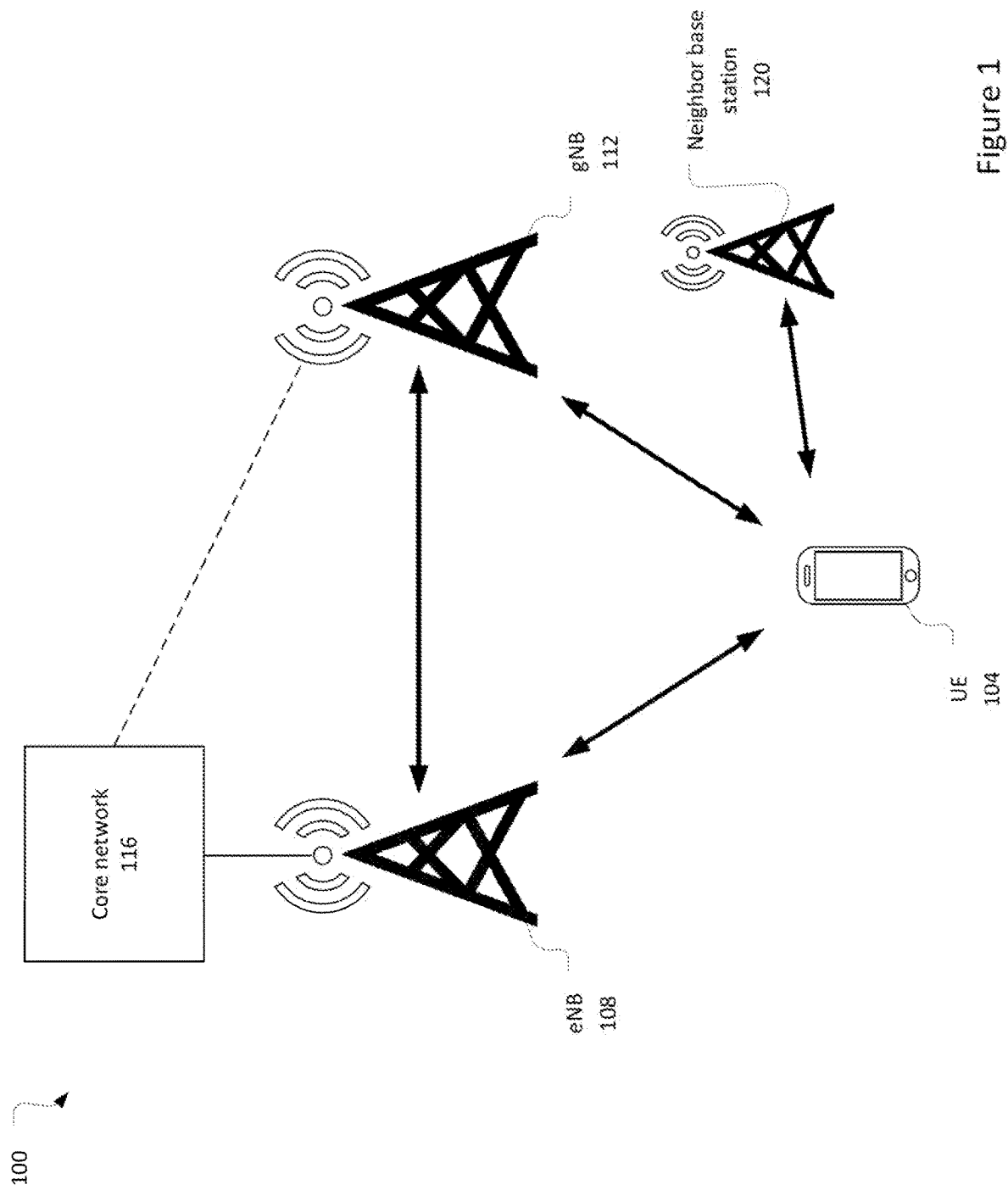
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are dead identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 communicatively coupled with one or more base station such as, for example, an evolved node B (eNB) 108 and a gNB 112. The UE 104 and the base stations may communicate over air interfaces compatible with 3GPP TSs such as those that define Long Term Evolution (LTE) and Fifth Generation (5G) new radio (NR) system standards. The eNB 108 may provide one or more LTE evolved universal terrestrial radio access (E-UTRA) cells to provide E-UTRA user plane and control plane protocol terminations toward the UE 104. The gNB 112 may provide one or more 5G NR cells to provide NR user plane and control plane protocol terminations toward the UE 104.

The network environment 100 may support dual connectivity (DC) operation in which the UE 104 may be configured to utilize radio resources provided by distinct schedulers located in the eNB 108 and the gNB 112. Given that the eNB 108 and the gNB 112 provide serving cells with different radio access technologies (RATs), the DC operation may also be referred to as multi-RAT DC or multi-radio DC (MR DC). The base stations may be coupled with each other via an X2 interface over an ideal or non-ideal backhaul.

One of the base stations may be configured as a master node (MN) to provide a control plane connection to the core network 116. The MN may be associated with the group of serving cells referred to as a master cell group (MCG), which includes a primary cell (SpCell) and optionally one or more secondary cells (SCells) in a carrier aggregation (CA) deployment. The SpCell of the MCO may also be referred to as a PCell.

The other base station may be configured as a secondary node (SN), which may not have a control plane connection to the core network 116. The SN may be used to provide additional resources to the UE 104. The SN may be associated with a group of serving cells referred to as a secondary cell group (SCG), which includes an SpCell and one or more SCells in a CA deployment. The SpCell of the SCG may also be referred to as a PScell.

Embodiments described herein include the eNB 108 operating as the MN and the eNB 112 operating as the SN. This may=be referred to as E-UTRA-NR (EN) DC. In this context, the eNB 108 may also be referred to as MN eNB 108, which provides an LTE PCell, and the gNB may be referred to as the SN gNB 112, which provides an NR PSCell.

The cells of the MCG and SCG may be in a frequency range 1 (FR1), corresponding to frequency range 410 MHz-7125 MHz or frequency range 2 (FR2) corresponding to frequency range 24,250 MHz-52,600 MHz.

At least the MN (for example, the eNB 108) may be coupled with the core network 116 via an S1 interface. In some embodiments, the SN (for example, the gNB 112) may also be coupled with the core network 116. In some embodiments, the core network 116 may be an evolved packet core (EPC), in which case the gNB 112 may be referred to as an en-gNB. In other embodiments, the core network 116 may be a 5G core network (5GC), in which case the eNB 108 may be a ng-eNB.

The base stations may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers; and the physical channels may transfer information across the air interlace. The UE 104 may include two MAC entities to enable communication with the MCG and SCG.

In some embodiments, the MN eNB 108 and the SN gNB 112 may configure measurement objects (MOs) to the UE 104. An MO may identify time and frequency location of synchronization signal/physical broadcast channel blocks (SSBs) and channel state information-reference signal (CSI-RS) resources to be measured. In some embodiments, the MOs may configure measurements to enable the UE 104 to identify and measure intra-frequency, inter-frequency, or inter-RAT cells provided by, for example, a neighbor base station 120. The MOs may configure the measurements to be performed within measurement gaps in which the UE 104 suspends its communication with serving cells to perform the measurements.

In some embodiments both the base stations may configure the UE 104 with NR MOs, for example, MOs that identify SSBs/CSI-RS resources within the NR cells. These MOs may include intra-RAT MOs and inter-RAT MOs. An intra-RAT MO may configure intra-RAT measurements, which may include inter-frequency and intra-frequency measurements. The SN gNB 112 may provide the UE 104 with an intra-RAT MO to configure the UE 104 to measure an NR frequency layer. An inter-RAT MO may configure inter-RAT measurements. For example, the MN eNB 108 may provide the UE 104 with an inter-RAT MO to configure the UE 104 to measure the NR frequency layer.

Figure 2:
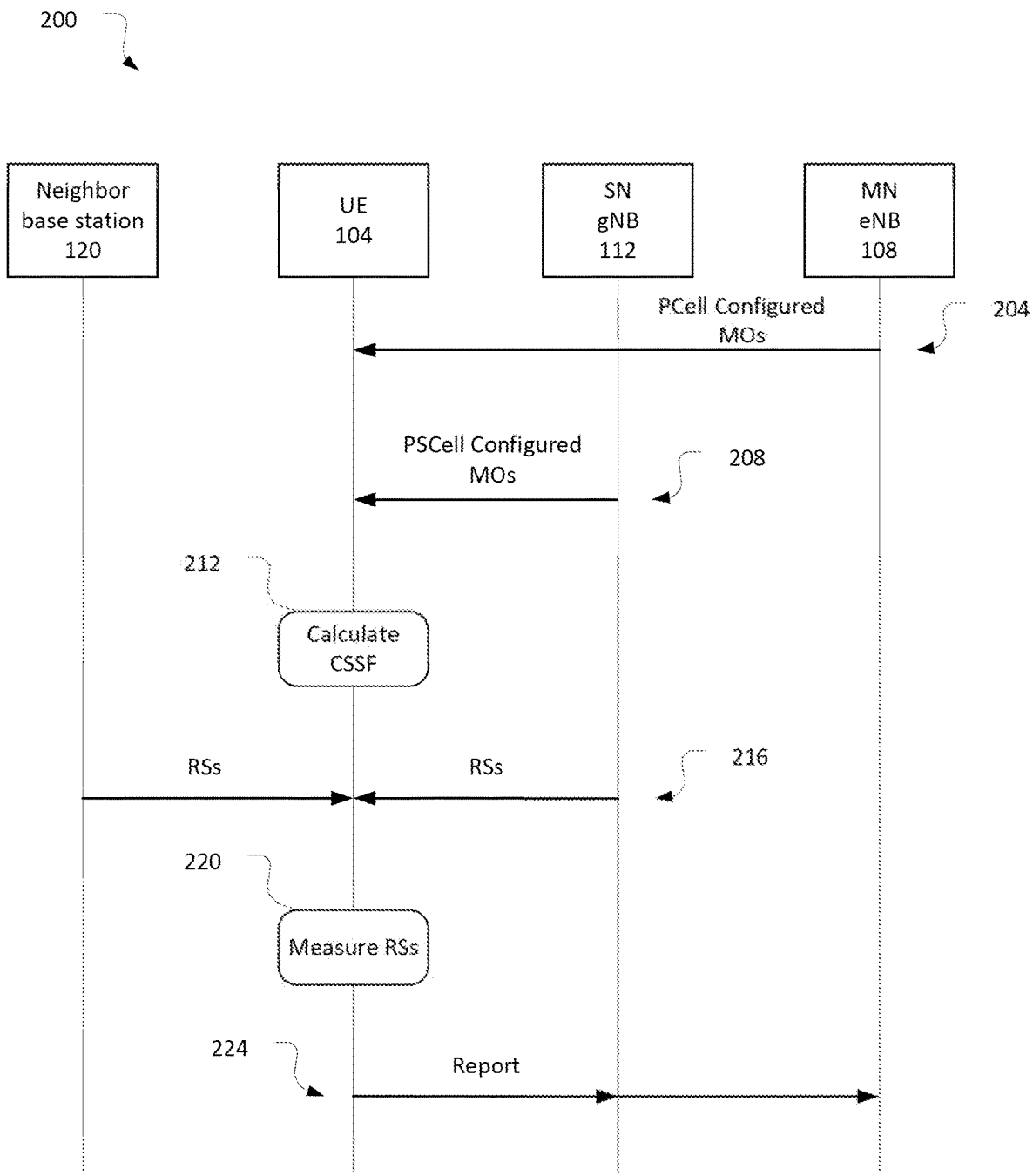
FIG. 2 illustrates a measurement procedure in accordance with some embodiments.

FIG. 2 illustrates a measurement operation 200 in accordance with some embodiments.

The measurement operation 200 may include, at 204, the MN eNB 108 providing PCell configured MOs to configure the UE 104 to measure various component carriers. The component carriers configured for measurement may correspond to NR serving cells (for example, component carriers that support the PSCell or SCell of the SCG) or NR non-serving cells (for example, component carriers that do not support a serving cell of the SCG).

The measurement operation 200 may further include, at 20i, the SN gNB 112 providing PSCell configured MOs to configure the UE 104 to measure various component carriers. These component carriers configured for measurement may also correspond to NR serving cells or NR non-serving cells.

Figure 3:
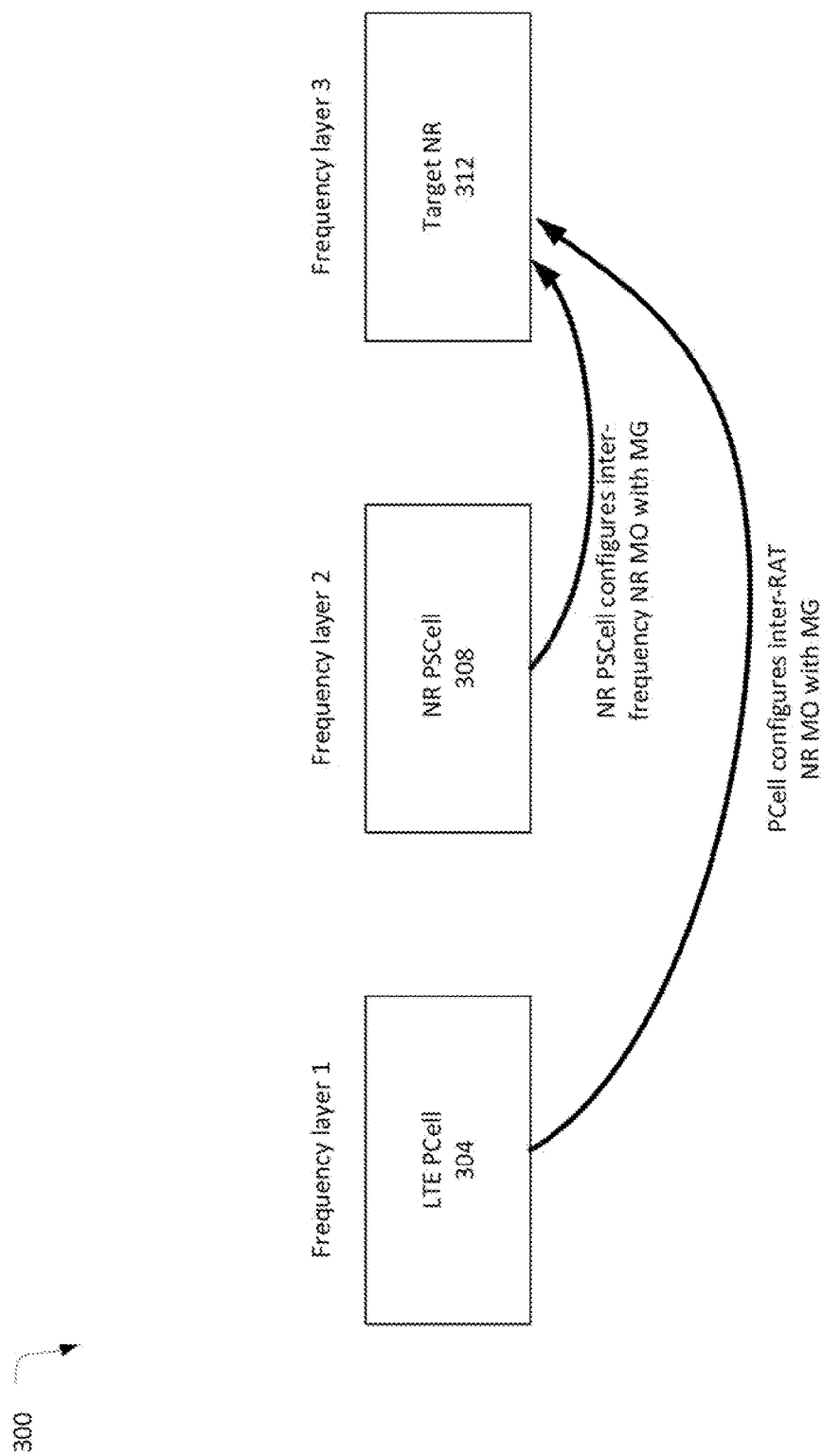
FIG. 3 illustrates a measurement object configuration scenario in accordance with some embodiments.
Figure 4:
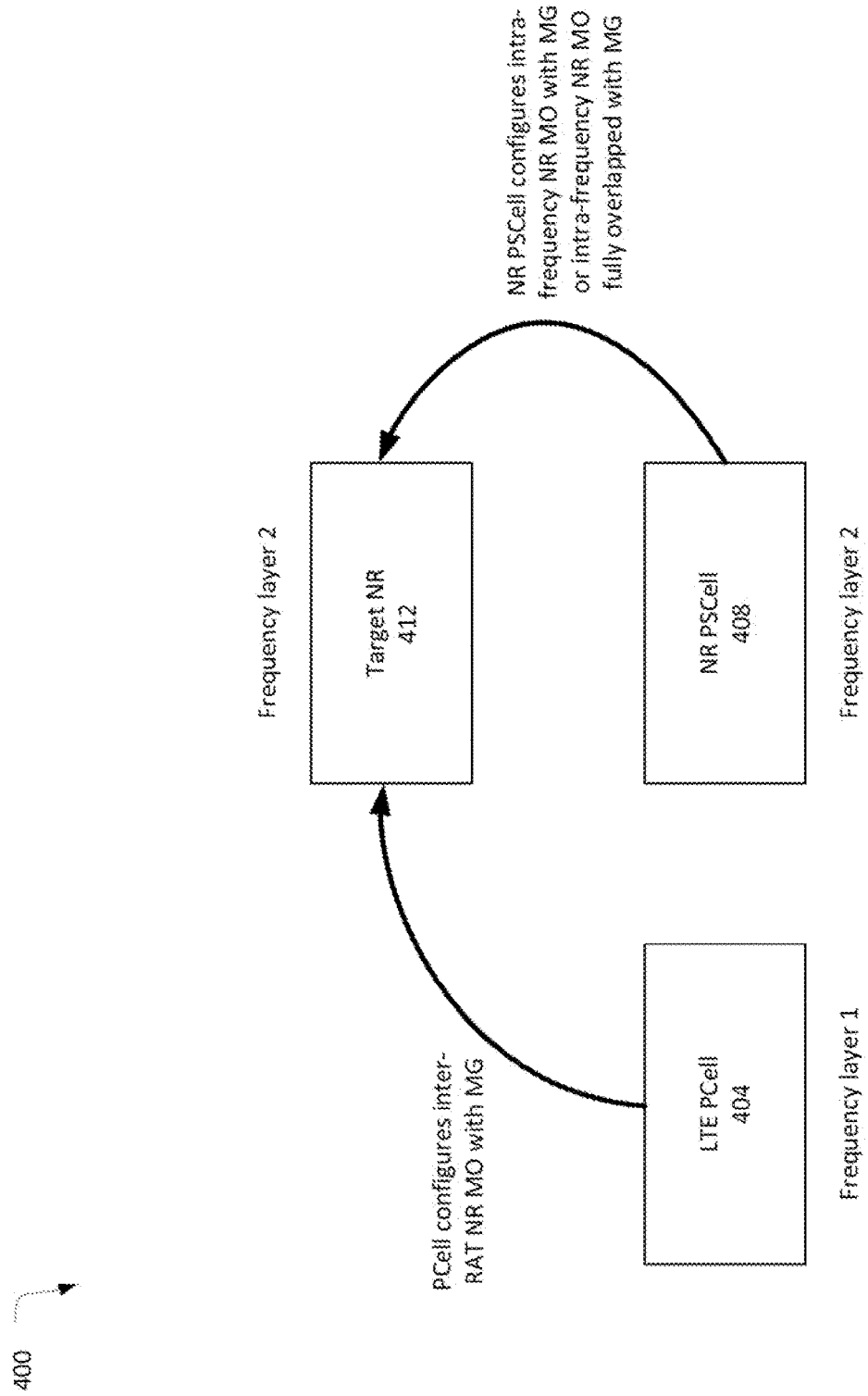
FIG. 4 illustrates another measurement object configuration scenario in accordance with some embodiments.

In some embodiments, an MO from the PCell configured MOs and an MO from the PSCell configured MOs may target the same frequency layer, which may complicate the calculation of the measurement period. FIGS. 3-4 illustrate examples of MO configuration scenarios in which multiple MOs target common NR frequency layers in accordance with some embodiments.

For the MO configuration scenario 300, an LTE PCell 304 (provided by the MN eNB 108) operating on frequency layer 1 and NR PSCell 308 (provided by, the SN gNB 112) operating on frequency layer 2 may provide MOs for performing measurements on target NR 312, which may be in frequency layer 3. In particular, PCell 304 may configure the UE 104 with an inter-RAT NR MO with measurement gap (MG) for the target NR 312 and the PSCell 308 may configure the UE 104 with an inter-frequency NR MO with MG for the target NR 312.

For the MO configuration scenario 400, an LTE PCell 404 (provided by the MN eNB 108) operating on frequency layer 1 and NR PSCell 408 (provided by the SN gNB 112) operating on frequency layer 2 may provide MOs for performing measurements on target NR 412, which may be in frequency layer 2 in this scenario. In particular, PCell 404 may configure the UE 104 with an inter-RAT NR MO with MG for the target NR 412 and the PSCell 408 may configure the UE 104 with an intra-frequency NR MO with MG for the target NR 412. In some embodiments, instead of configuring the UE 104 with an intra-frequency NR MO with MG for the target NR 412, the NR PSCell 408 may configure the UE 104 with an intra-frequency NR MO that is fully overlapped with an MG. Thus, even though the configured MO does not itself require a measurement gap, it may be configured in a MG that may correspond to, for example, another MO.

Referring again to FIG. 2, at 212, the UE 104 may calculate an CSSF to use for measurements configured by the MOs. Various embodiments describe how to calculate the CSSF for measurement periods for performing measurements within MGs based on MOs such as those described in various scenarios such as those introduced in 300 and 400.

In some embodiments, the UE 104 may use a CSSF to scale measurement delay requirements and NR positioning reference signal (PRS)-based measurements when the UE 104 is configured to monitor multiple MOs. A $CSSF_{within\_gap,i}$ may be the scaling factor for measurements of measurement object i conducted within measurement gaps. As defined in 3GPP TS 38.133 v16.5.0 (2020-09), the $CSSF_{within\_gap,i}$ may be applied to measurements configured by the following MOs that may be relevant to embodiments of the disclosure:

Intra-frequency MO with no measurement gap in clause 9.2.5, when all of the [SSB measurement timing configuration (SMTC)] occasions of this intra-frequency measurement object are overlapped by the measurement gap.

Intra-frequency MO with measurement gap in clause 9.2.6.

Inter-frequency measurement with no measurement gap in clause 9.3.9, when all of the SMTC occasions of this inter-frequency measurement object are overlapped by the measurement gap, if UE supports interFrequencyMeas-NoGap-r16.

Inter-frequency measurement object with measurement gap in clause 9.3.4.

E-UTRA Inter-RAT measurement object in clauses 9.4.1 and 9.4.3.

NR inter-RAT measurement object configured by the E-UTRAN PCell (TS 36.133 [v16.7.0 (2020-10-09)] clause 8.17.4).

TS 38.133, Section 9.1.5.2.

In EN-DC, the MG-based CSSF design may include a number of components that influence the determination of the measurement procedure and the measurement resource allocation by controlling the measurement delay for each MO on same or different frequency layers. These components include an $M_{intra}$ value corresponding to a number of intra-frequency MOs and $M_{inter}$ value corresponding to a number of inter-frequency MOs. Calculation of the $CSSF_{within\_gap\_i}$ may be further based or a measurement gaps sharing scheme (measGapSharingScheme) that allocates measurement resources between inter-frequency and intra-frequency measurements.

For example, TS 38.133, goes on to define the $CSSF_{within\_gap,i}$ as follows:

If measGapSharingScheme is equal sharing, $CSSF_{within\_gap,j} = \max(\text{ceil}(R_i \times M_{tot,i,j}))$, where j=0 . . . (160/MGRP)-1

If measGapSharingScheme is not equal sharing and measurement object i is an intra-frequency measurement object, $CSSF_{within\_gap,i}$ is the maximum among $\text{ceil}(R_i \times K_{intra} \times M_{intra,i,j})$ in gaps where $M_{inter,i,j} \neq 0$, where j=0 . . . (160/MGRP)-1

$\text{ceil}(R_i \times M_{intra,i,j})$ in gaps where $M_{inter,i,j} = 0$, where j=0 . . . (160/MGRP)-1 measurement object i is an inter-frequency or inter-RAT measurement object, $CSSF_{within\_gap,i}$ is the maximum among $\text{ceil}(R_i \times K_{inter} \times M_{inter,i,j})$ in gaps where $M_{intra,i,j} \neq 0$, where j=0 . . . (160/MGRP)-1

$\text{ceil}(R_i \times M_{inter,i,j})$ in gaps where $M_{intra,i,j} = 0$, where j=0 . . . (160/MGRP)-1.

Where $R_i$ is the maximal ratio of the number of measurement gap where measurement object i is a candidate to be measured over the number of measurement gap where measurement object i is a candidate and not used for [reference signal time difference] RSTD measurement with periodicity Tprs>160 ms or with periodicity Tprs=160 ms but prs-MutingInfo-r9 is configured within an arbitrary 1280 ms period.

TS 38.133, section 9.1.5.2.1. The measurement gap repetition period (MGRP) may be the periodicity in which the configured measurement gap repeats and may be, for example, 20 milliseconds (ms), 40 ms, 80 ms, or 160 ms.

Inside EN-DC MG based CSSF, and $M_{intra,i,j}$ and $M_{inter,i,j}$ may consider the case when LTE PCell and NR PSCell configure the MG-based MO on the same frequency layer and in this scenario how to determine the $M_{intra,i,j}$ and $M_{inter,i,j}$ within MG.

Various types of MOs may be described to facilitate discussion of the embodiments.

A type-1 MO may be an MO that configures a measurement within a serving carrier. A type 1 MO may include R15 MG-based inn-frequency NR MO configured by NR PSCell. "MG-based," as used herein, may mean the measurement needs a measurement gap. As used herein, a R15 MO may be a MO compatible with Release 15 3GPP TSs including, for example, TS 38.133 (v15.11.0 (2020-10-09) (hereinafter, "TS 38.133 R15").

A type-2 MO may be an MO that configures a measurement within a serving carrier. The type-2 MO may include an R15 intra-frequency NR MO without MG configured by NR PSCell but the MO is fully overlapped with an MG. For example, while a type-2 MO may not require a measurement gap, it may be configured to perform the measurement within a measurement gap provided for another MO or for another purpose.

A type-3 MO may be an MO that configures a measurement within a non-serving component carrier. The type-3 MO may include an R15 inter-frequency NR MO configured by NR PSCell. R15 inter-frequency MO may always need an MG.

A type-4 MO may be an MO that configures a measurement within a serving component carrier. The type-4 MO may be an inter-RAT NR MO configured by an LTE PCell and on the same frequency layer as a type-1 or type-2 MO.

A type-5 MO may be an MO that configures a measurement within a non-serving component carrier. The type-5 MO may be an inter-RAT NR MO configured by LTE PCell and on the same frequency layer as a type-3 MO.

A type-6 MO may be an MO that configures a measurement within a serving, component carrier. The type-6 MO may be an inter-RAT NR MO configured by LTE PCell and on a frequency layer that is different from frequency layers on which type-1 MO or type-2 MOs are configured.

A type-7 MO may be an MO that configures a measurement within a non-serving component carrier. The type-7 MO may be an inter-RAT NR MO configured by LTE PCell and on a frequency layer that is different from a frequency layer on which a type-3 MO is configured.

A type-8 MO may be an MO for another type of RAT, for example, universal terrestrial radio access network (UTRAN) or E-UTRAN.

Embodiments disclose at least three options to address potentially overlapping configurations of pairs of these MOs. In a first option, for $M_{intra,i,j}$ and $M_{inter,i,j}$, the UE 104 may count all configured MOs or carriers regardless of whether the MOs are on the same frequency layer. In a second option, for the $M_{intra,i,j}$ and $M_{inter,i,j}$, the UE 104 may count the configured MOs or carriers based on whether they satisfy merging criteria, MOs that do not meet the MO merging criteria may be counted independently. MOs that do meet the MO merging criteria may be counted as one. In a third option, for the $M_{intra,i,j}$ and $M_{inter,i,j}$, the network (for example, the MN eNB 108 and the SN gNB 112) may be configured to avoid certain MO configuration scenarios. These options may be described in more detail below in accordance with some embodiments.

Referring again to FIG. 2, at 216, the SN gNB 112 or neighbor base station 120 may transmit reference signals on various component carriers including, for example, serving or non-serving component carriers. These reference signals may be SSB or CSI-RS.

The measurement operation 200 may further include, at 220, the UE 104 measuring the RSs transmitted by the SN gNB 112 or neighbor base station 120. The measurements may be within measurement gaps as configured by the MOs received from the MN eNB 108 and the SN gNB 112. The measurements may be conducted within serving component carriers or non-serving component carriers within a measurement period determined based on the calculated CSSF.

The UE 104 may send a report to the network based on the measurement of the RSs. The report may be sent to the MN eNB 108 or the SN gNB 112. The report may be periodic, aperiodic, or event-based.

According to the first option briefly introduced above, the UE 104, operating in EN-DC may independently count configured MOs for $M_{intra,i,j}$ and $M_{inter,i,j}$ as follows.

For $M_{intra,i,j}$, the UE 104 may independently count all configured MOs or carriers of types 1, 2, 4, and 6 (for example, MOs configured on serving NR component carriers). This may be the case whether the MOs are on the same frequency layer, which was previously not addressed, or on different frequency layers, which may be consistent with operation of legacy networks. To implement this option, the definition of $M_{intra,i,j}$ may be updated to be a number of intra-frequency measurement objects on serving carriers configured by NR PSCell that are candidates to be measured in gap j wherein the measurement object i is also a candidate. Otherwise, $M_{intra,i,j}$ equals 0.

For $M_{inter,i,j}$, the UE 104 may independently count all configured MOs or carriers of types 3, 5, 7, and 8 (for example, MOs configured on non-serving NR components carriers or in other RATs). This may be the case whether the MOs are on the same frequency layer, which was previously not addressed, or on different frequency layers, which may be consistent with operation of legacy networks. To implement this option, the definition of $M_{inter,i,j}$ may be updated to be a number of NR inter-frequency measurement objects on non-serving carriers configured by NR PSCell, MR inter-RAT measurement objects on serving carriers or non-serving carriers configured by E-UTRA PCell, E-UTRA inter-frequency measurement objects configured by E-UTRA PCell, and UTRA inter-RAT measurement objects configured by E-UTRA PCell which are candidates to be measured in gap j wherein the measurement object i is also a candidate. Otherwise, $M_{intra,i,j}$ equals 0.

The UE 104 may then determine $M_{tot,i,j} = M_{inter,i,j} + M_{intra,i,j}$. $M_{tot,i,j}$ may be the total number of intra-frequency, inter-frequency, and inter-RAT MOs (including, for example, MO types 1-8) that are candidates to be measured in gap j where the measurement object i is also a candidate. Otherwise, $M_{tot,i,j}$ equals 0.

Consider, for example, a $MO_i$ configured by the NR PSCell for a measurement to be performed in measurement gap j. To determine the $M_{tot,i,j}$ value, the UE 104 may determine all the MOs that are also candidates to be measured in the measurement gap j. If there are none, $M_{tot,i,j}$ value may be set to zero. Otherwise, the $M_{tot,i,j}$ value may be sent to the number of determined MOs. The UE 104 may then determine the CSSF for the MOi based on the $M_{tot,i,j}$ value.

According to the second option briefly introduced above, the UE 104, operating in EN DC, may count the configured MOs or carriers based on whether they satisfy a merging criteria In some embodiments, the UE 104 may selectively determine whether pairs of MOs, configured on the same frequency layer, should be counted as one or two in determining the $M_{inter,i,j}$ and $M_{intra,i,j}$ values. This may be based on the merging rule provided in 3GPP TS 38.133 for determining a number of layers the UE 104 is capable of monitoring. In particular, it is provided that When the E-UTRA PCell and PSCell configures the same NR carrier frequency layer to be monitored by the UE in synchronous intra-band EN-DC, this layer shall be counted only once to the total number of effective carrier frequency layers provided that the SFN-s and slot boundaries are aligned, unless the configured NR carrier frequency layers to be monitored have—different RSSI measurement resources or—different deriveSSB-IndexFromCell indications or—different [SSB-based measurement timing] configurations.

3GPP TS 38.133, Section 9.1.3.2.

The deriveSSB-IndexFromCell indication may provide the UE 104 with information about frame boundary alignment. For example, when this indication is enabled, the UE 104 may assume half frame, subframe, and slot boundary alignment across cells on a same frequency carrier is within a predetermined tolerance and SFNS of all cells on the same frequency carrier are the same.

In some embodiments, when first and second MOs are directed to the same frequency layer and satisfy the merging criteria (for example, include the same SMT see configuration, the same RSSI measurement resources, and the same deriveSSB-IndexFromCell indications), the UE 104 may merge the two MOs and only count '1' toward the corresponding $M_{inter,i,j}$ and $M_{intra,i,j}$ values.

The $M_{inter,i,j}$ and $M_{intra,i,j}$ values may be determined for the second option as follows.

For $M_{intra,i,j}$, the UE 104 may: independently count configured MOs or carriers of types 1, 2, 4, and 6 (for example, MOs configured on seeing NR component carriers) that cannot be merged due to MO merging criteria as described, for example, in TS 38.133, section 9.1.3.2; and count MOs that can be merged based on the MO merging criteria as one MO. Other than the possible merging of some MOs, the definition of the $M_{intra,i,j}$ may be the same as option 1, for example, $M_{intra,i,j}$ may be a number of intra-frequency measurement objects on serving carriers configured by NR PSCell that are candidates to be measured in gap j wherein the measurement object i is also a candidate. Otherwise, $M_{intra,i,j}$ equals 0.

For $M_{inter,i,j}$, the UE 104 may: independently count configured MOs or carriers of types 3, 5, 7, and 8 (for example, MOs configured on non-serving NR components carriers or in other RATs) that cannot be merged due to the MO merging criteria as described in, for example, TS 38.133, section 9.1.3.2; and count MOs that can be merged based on the MO merging criteria as one MO. Other than the possible merging of some MOs, the definition of the $M_{inter,i,j}$ may be the same as option 1, for example, $M_{inter,i,j}$ may be a number of NR inter-frequency measurement objects on non-serving carriers configured by NR PSCell, NR inter-RAT measurement objects on serving carriers or non-serving carriers configured by E-UTRA PCell, E-UTRA inter-frequency measurement objects configured by E-UTRA PCell, and UTRA inter-RAT measurement objects configured by E-UTRA PCell which are candidates to be measured in gap j wherein the measurement object i is also a candidate. Otherwise, $M_{intra,i,j}$ equals 0.

The UE 104 may then determine $M_{tot,i,j}=M_{inter,i,j}+M_{intra,i,j}$. $M_{tot,i,j}$ may be the total number of independently counted and merged pairs of intra-frequency, inter-frequency, and inter-RAT MOs (including, for example, MO types 1-8) that are candidates to be measured in gap j where the measurement object i is also a candidate. Otherwise, $M_{tot,i,j}$ equals 0.

According to the third option briefly introduced above, a network operating in EN-DC mode may operate to prevent certain MO configuration scenarios.

For example, the network may communicate between e LTE PCell (provided by, for example, MN eNB 108) and the NR PSCell (provided by, for example, SN gNB 112) to avoid MO configuration on the same frequency layer. Communication between the MN eNB 108 and the SN gNB 112 may be accomplished by transmitting measurement configurations. The MN eNB 108 may provide these measurement configurations to the SN gNB 112 or vice versa.

In some embodiments, the measurement configurations may restrict the network from configuring a type-4 MO with either a type-1 MO or a type-2 MO; or configuring a type-3 MO with a type-5 MO. These restricted configurations would result in MOs configured on the same frequency layer. Given that the network will avoid these specific configurations, the UE 104 may determine $M_{inter,i,j}$ and $M_{intra,i,j}$ in measurement gap by independently counting all configured MOs.

The restricted configurations may be provided in accordance with one of the following options.

In some embodiments, the network may communicate between the LTE PCell and the nR PSCell to assure that the LTE PCell will not configure inter-RAT NR measurement, and only the NR PSCell can configure types 1, 2, and 3 NR measurements. In these embodiments, the UE 104 may only: count type 1 and 2 NR MOs configured from NR PSCell for $M_{intra,i,j}$ in MG; and count type 3 NR MO configured from NR PSCell for $M_{inter,i,j}$ in MG.

In other embodiments, the network may communicate between the LTE PCell and the MR PSCell to assure that the LTE PCell will configure inter-RAT NR measurements and the NR PSCell will not configure types 1, 2, or 3 NR measurements. In these embodiments, the UE 104 may only: count type 6 NR MOs configured from LTE PCell for $M_{intra,i,j}$ in MG; and count types 7 and 8 NR MO configured from LTE PCell for $M_{inter,i,j}$ in MG.

Figure 5:
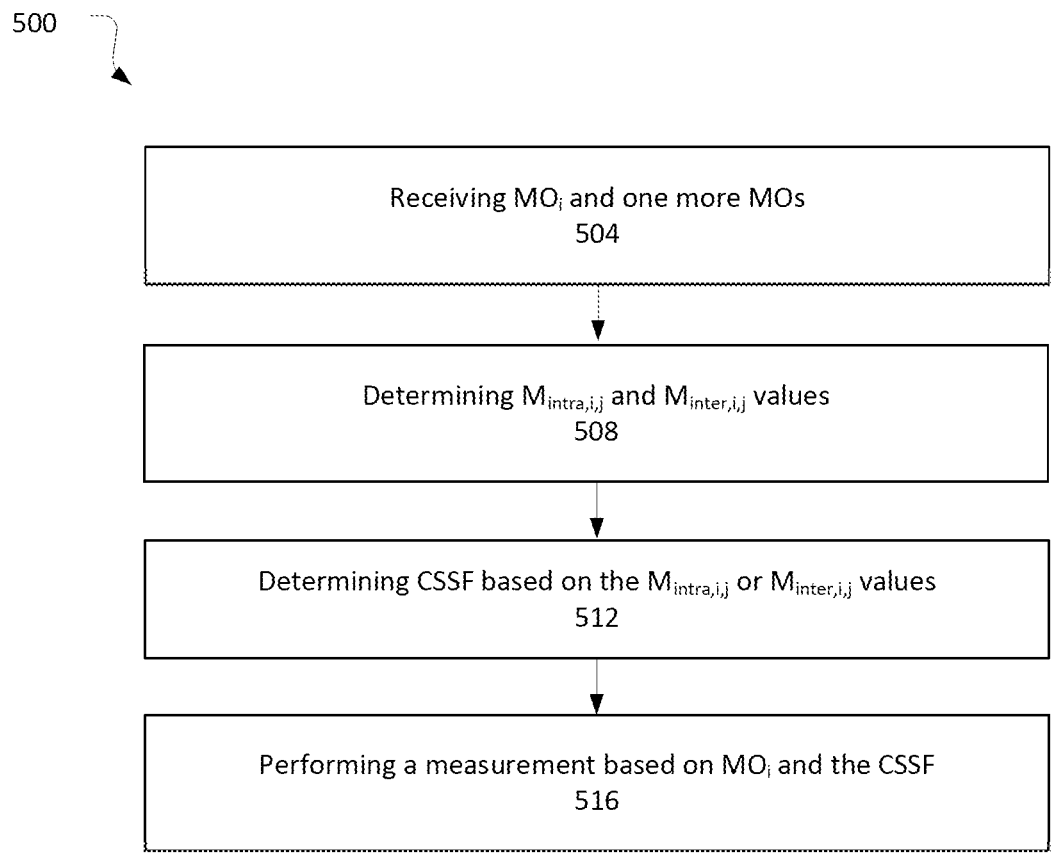
FIG. 5 illustrates an operational flow/algorithmic structure in accordance with some embodiments.

FIG. 5 illustrates an operation flow/algorithmic structure 500 in accordance with some embodiments. The operation flow/algorithmic structure 500 may be performed or implemented by a UE such as, for example, UE 104 or UE 800; or components thereof, for example, baseband processor 804A.

The operation flow/algorithmic structure 500 may include, at 504, receiving a first MO ($MO_i$) and one or more additional MOs. The $MO_i$ may be a candidate for measurement within a measurement gap j.

In some embodiments, the operation flow/algorithmic structure 500 may be in the context of an EN-DC connection and the MOs may be received from an LTE PCell (for example, from MN eMB 108) or an NR PSCell (for example, from SN gNB 112). The MOs may configure a measurement on one or more MR frequency layers, in which case, the MOs received from the LTE PCell may be inter-RAT MOs and the MOs received from the NR PSCell may be intra-RAT MOs.

The operation flow/algorithmic structure 500 may further include, at 508, determining $M_{intra,i,j}$ and $M_{inter,i,j}$ values. The $M_{intra,i,j}$ and $M_{inter,i,j}$ values may be determined based on a number of intra-frequency MOs and inter-frequency MOs received at 504. In some embodiments, the values may be determined by independently counting all MOs within a particular category. In other embodiments, the values may be determined by independently counting MOs within a category that do not meet merging criteria and counting pairs (or sets) of MOs within the category do meet merging criteria.

In some embodiments, at 508, the UE may determine the $M_{inter,i,j}$ value based on a number of inter-frequency MOs that are candidates to be measured in the measurement gap, wherein the number of inter-frequency MOs include a number of inter-frequency MOs that are configured by the E-UTRA PCell and a number of inter-frequency MOs that are configured by the NR PSCell.

In some embodiments, at 508, the UE may determine the $M_{intra,i,j}$ value based on a number of intra-frequency MOs that are configured on serving carriers by the NR PSCell and are candidates to be measured in the measurement gap.

The operation flow/algorithmic structure 500 may further include, at 512, determining a CSSF based on the $M_{intra,i,j}$ or $M_{inter,i,j}$ values.

If the measurement gap sharing scheme is equal sharing, the CSSF may be determined based on $M_{tot,i,j}$, which is a sum of the $M_{intra,i,j}$ or $M_{inter,i,j}$ values, as, for example, $Max(ceil(R_i \times M_{tot,i,j}))$, where $R_i$ is the maximal ratio described above.

If the measurement gap sharing scheme is equal sharing, the CSSF may be calculated based on a number of carriers that are to be measured. For example, if the UE receives two MOs for one target carrier, then this target carrier CSSF may be equal to 2 * carrier_number. The '2' in this calculation may indicate that the two MOs share the MG resource on the one target carrier; and the carrier_number corresponds to all the target carriers that equally share the MG resource, with each of the target carriers having a 1/carrier_number portion of the MG resource.

If the measurement gap sharing scheme is not equal sharing and the $MO_i$ is an intra-frequency MO, the CSSF may be the maximum among: $ceil(R_i \times K_{intra} \times M_{intra,i,j})$ in gaps where $M_{inter,i,j} \neq 0$; and $ceil(R_i \times M_{intra,i,j})$ in gaps where $M_{inter,i,j} = 0$, where $K_{intra} = 1/X * 100$ and X is based on signaled measGapSharingScheme and Table 1.

TABLE 1

| measGapSharingScheme | Value of X (%) |
| --- | --- |
| '00' | Equal splitting |
| '01' | 25 |
| '10' | 50 |
| '11' | 75 |

If the measurement gap sharing scheme is not equal sharing and the $MO_i$ is an inter-frequency or inter-RAT MO, the CSSF may be the maximum among:

$ceil(R_i \times K_{inter} \times M_{inter,i,j})$ in gaps where $M_{inter,i,j} \neq 0$; and ceil $(R_i \times M_{inter,i,j})$ in gaps where $M_{inter,i,j} = 0$, where $K_{inter} = 1/(100-X) * 100$ and X is based on signaled measGapSharingScheme and Table 1.

The operation flow/algorithmic structure 500 may further include, at 516, performing a measurement based on the $MO_i$ and the CSSF. The measurement may be performed within the measurement gap as configured by the $MO_i$ received at 504. The measurement may be performed within a measurement period determined by the CSSF. The CSSF determined at 512 may facilitate the distribution of radio-frequency or baseband resources of a searcher by scaling a measurement period when additional measurements need to be performed.

Figure 6:
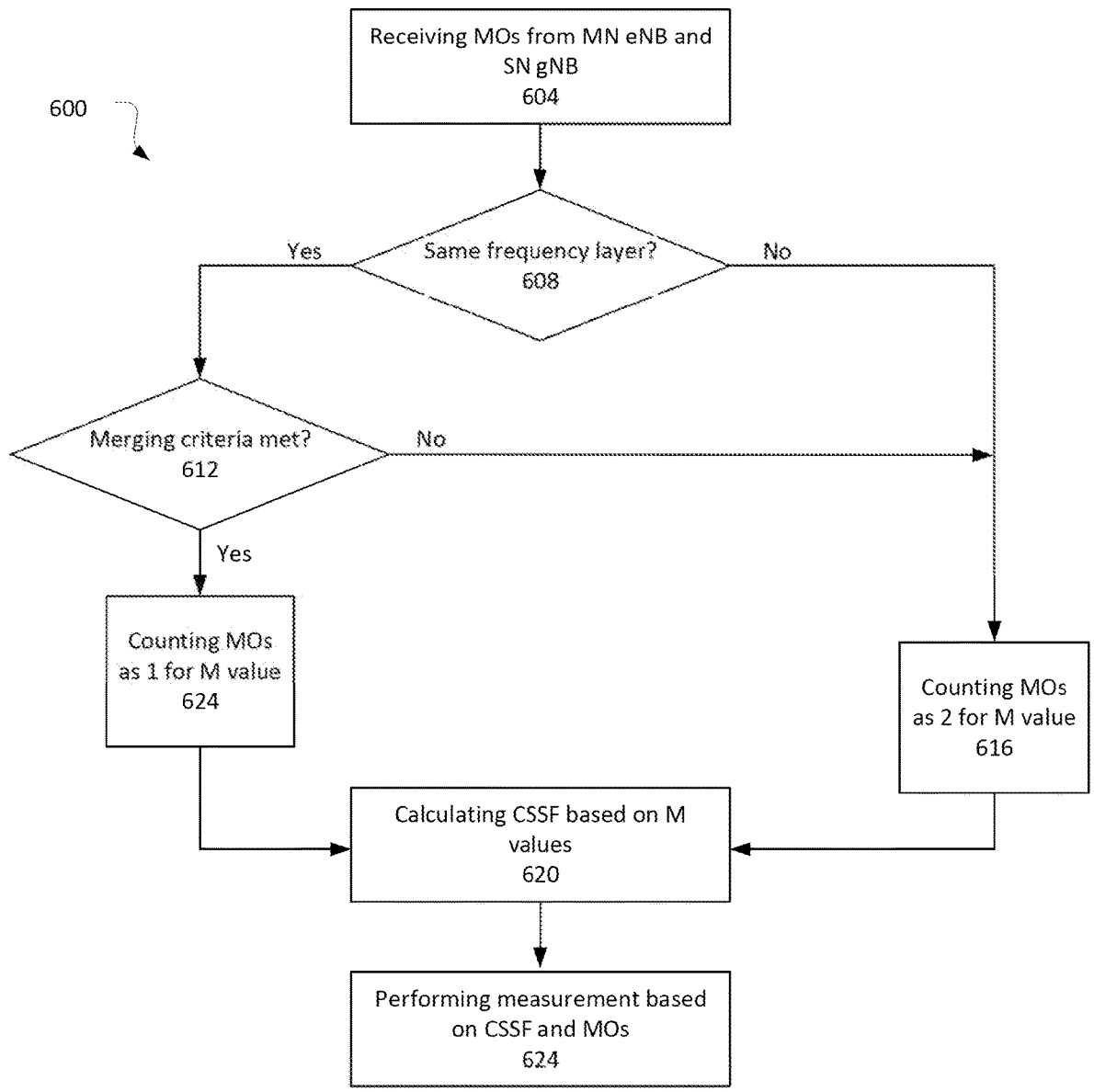
FIG. 6 illustrates another operational flow/algorithmic structure in accordance with some embodiments.

FIG. 6 illustrates an operation flow/algorithmic structure 600 in accordance with some embodiments. The operation flow/algorithmic structure 600 may be performed or implemented by a UE such as, for example, UE 104 or UE 900; or components thereof, for example, baseband processor 904A.

The operation flow/algorithmic structure 600 may include, at 604, receiving MOs from MN eNB and SN gNB. The MOs may configure measurements on one or more serving component carriers (for example, cells provided by the SN gNB) or non-serving component carriers (for example, cell provided by a neighbor base station). The MOs may be NR MOs for measurement gap that include inter-RAT MOs from the MN eNB or intra-RAT MOs from the SN gNB.

The operation flow/algorithmic structure 600 may further include, at 608, determining whether the MOs are on the same frequency layer. For example, the UE may determine whether more than one MO targets the same component carrier, which may be serving or non-serving component carrier.

If it is determined, at 608, that the two MOs do not target the same frequency layer, the operation flow/algorithmic structure 600 may advance to counting the two MOs as two for an M value determination at 616. The M value determination may be for determining an $M_{intra,i,j}$ or $M_{inter,i,j}$ value.

Following 616, the operation flow/algorithmic structure 600 may advance to calculating CSSF based on one or more M values at 620. The CSSF may be calculated as described above with respect to 512 of FIG. 5.

If it is determined, at 608, that the two MOs target the same frequency layer, the operation flow/algorithmic structure 600 may advance to determining whether merging criteria are met at 612. Determining whether the merging criteria are met may include comparing designated parameters from the first MO to designated parameters of the second MO. The designated parameters may include RSSI measurement resources, derivedSSB-IndexFromCell indications, and SMTC configurations.

If one or more of the designated parameters from the two MOs are different, the merging criteria may not be met and the, operation flow/algorithmic structure 600 may advance to counting the MOs as two for the M value at 616. Thus, in this instance, the count value for the pair of MOs is two.

If, at 612, it is determined that all the designated parameters from the two MOs are the same, the merging criteria may be met and the operation flow/algorithmic structure 600 may advance to counting the MOs as one for the M value at 624. Thus, in this instance, the count value for the pair of MOs is one.

Following 624, the operation flow/algorithmic structure 600 may advance to calculating the CSSF based on one or more of the M values at 620.

The operation flow/algorithmic structure 600 may further include, after 620, performing measurement based on the CSSF and an MO. The MO for which the performance is performed may be one of the two MOs considered for merging or may be different.

In some embodiments, the determination of whether MOs may be merged (for example, operation 608, 612, 616, and 624) maybe done for each of a number of configured MOs. The $M_{intra,i,j}$ and $M_{inter,i,j}$ values may then be determined by independently counting all MOs within a particular category (for example, intra-frequency MOs and inter-frequency/RAT) that do not meet merging criteria and counting pairs (or sets) of MOs within the category do meet merging criteria.

Figure 7:
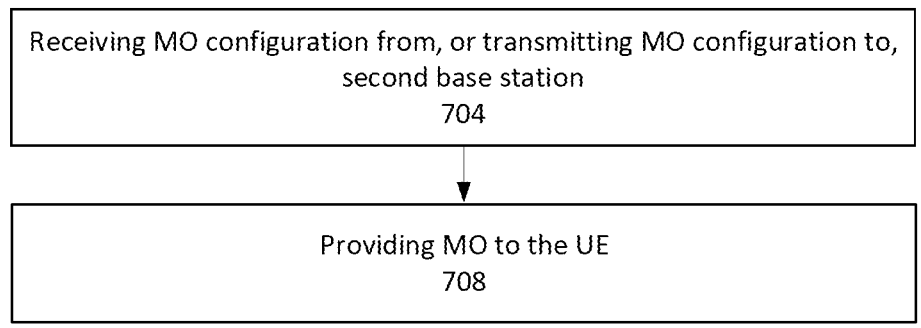
FIG. 7 illustrates another operational flow algorithmic structure in accordance with some embodiments.

FIG. 7 illustrates an, operation flow/algorithmic structure 700 in accordance with some embodiments. The operation flow/algorithmic structure 700 may be performed or implemented by a first base station such as, for example, MN eNB 108, SN gNB 112, or base station 900; or components thereof, for example, baseband processor 904A.

The operation flow/algorithmic structure 700 may include, at 704, receiving an MO configuration from, or transmitting the MO configuration to, second base station. The MO configuration may be transmitted from an MN to an SN or from an SN to the MN via an X2 interface. The MO configuration may restrict provision of a plurality of MOs to the UE for one frequency layer of the NR cell.

In some embodiments, the MO configuration may restrict the network nodes from configuring a type-4 MO with a type-1 MO or a type-2 MO; or from configuring a type-3 MO with a type-5 MO.

In some embodiments, the MO configuration may restrict the MN eNB from configuring an inter-RAT NR MO; while the NR gNB may be allowed to configure type 1, 2, or 3 NR MOs.

In some embodiments, the MO configuration may restrict the NR gNB from configuring a type 1, 2, or 3 NR MO; while the SN eNB may be allowed to configure inter-RAT MOs.

The operation flow/algorithmic structure 700 may further include, at 708, providing an MO to the UE to configure the UE to perform a measurement within a measurement gap on the frequency layer. In embodiments in which the first base station is an MN eNB, the MO provided to the UE may be an inter-RAT MO for the NR frequency layer. In embodiments in which the first base station is an SN gNB, the MO provided to the UE may be an intra-frequency MO for the NR frequency layer.

Figure 8:
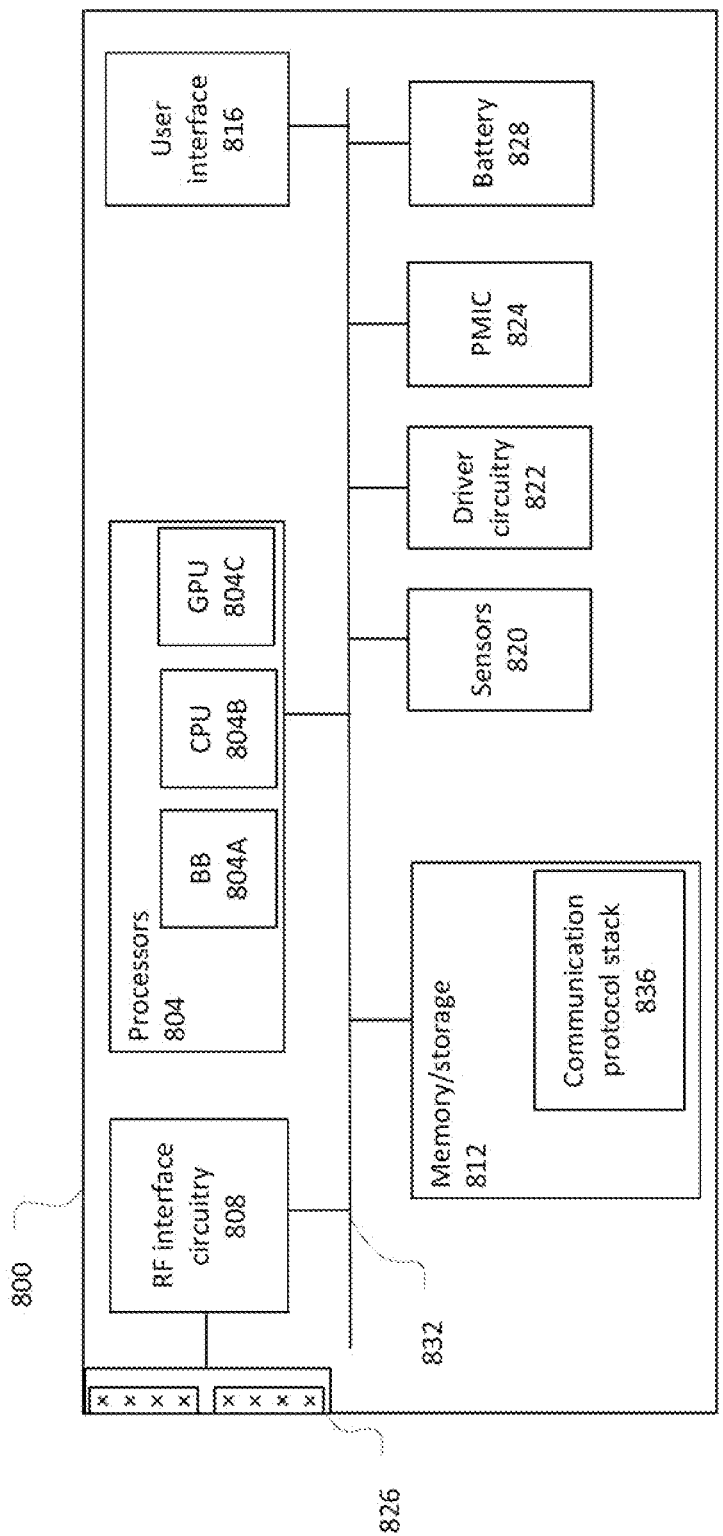
FIG. 8 illustrates a user equipment in accordance with some embodiments.

FIG. 8 illustrates a UE 800 in accordance with some embodiments. The UE 800 may be similar to and substantially interchangeable with UE 84 of FIG. 1.

The UE 800 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 800 may include processors. 804, RF interface circuitry 808, memory/storage 812, user interface 816, sensors 820, driver circuitry 822, power management integrated circuit (PMIC) 824, antenna structure 826, and battery 828. The components of the UE 800 may be implemented as integrated circuits (ICs), portions thereof, discrete electronic devices, or other modules, logic, hardware, software, firmware, or a combination thereof. The block diagram of FIG. 8 is intended to show a high-level view of some of the components of the UE 800. However, some of the components shown may be omitted, additional components may be present, and different arrangement of the components shown may, occur in other implementations.

The components of the UE 800 may be coupled with various other components over one or more interconnects 832, which may represent any type of interface, input/output, bus (local, system, or expansion), transmission line, trace, optical connection, etc. that allows various circuit components (on common or different chips or chipsets) to interact with one another.

The processors 804 may include processor circuitry such as, for example, baseband processor circuitry (BB) 804A, central processor unit circuitry (CPU) 804B, and graphics processor unit circuitry (GPU) 804C. The processors 804 may include any type of circuitry or processor circuitry that executes or otherwise operates computer-executable instructions, such as program code, software modules, or functional processes from memory/storage 812 to cause the UE 800 to perform operations as described herein.

In some embodiments, the baseband processor circuitry 804A may access a communication protocol stack 836 in the memory/storage 812 to communicate over a 3GPP compatible network. In general, the baseband processor circuitry 804A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 808.

The baseband processor circuitry 804A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 812 may include one or more non-transitory, computer-readable media that includes instructions (for example, communication protocol stack 836) that may be executed by one or more of the processors 804 to cause the UE 800 to perform various operations described herein. The memory/storage 812 include any type of volatile or non-volatile memory that may be distributed throughout the UE 800. In some embodiments, some of the memory/storage 812 may be located on the processors 804 themselves (for example, L1 and L2 cache), while other memory/storage 812 is external to the processors 804 but accessible thereto via a memory interface. The memory/storage 812 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 808 may include transceiver circuitry and radio frequency front module (RFEM) that allows the UE 800 to communicate with other devices over a radio access network. The RF interface circuitry 808 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 826 and proceed to filter and amplify (with a low-noise amplifier) the signal. The signal may be provided to a receiver of the transceiver that down-converts the RF signal into a baseband signal that is provided to the baseband processor of the processors 804.

In the transmit path, the transmitter of tho transceiver up-converts the baseband signal received from the baseband processor and provides the RE signal to the RFEM. The RFEM may amplify the RF signal through a power amplifier prior to the signal being radiated across the air interface via the antenna 826.

In various embodiments, the RF interface circuitry 808 may be configured to transmit/receive signals in a manner compatible with NR access technologies.

The antenna 826 may include antenna elements to convert electrical signals into radio waves to travel through the air and to convert received radio waves into electrical signals. The antenna elements may be arranged into one or more antenna panels. The antenna 826 may have antenna panels that are omnidirectional, directional, or a combination thereof to enable beamforming and multiple input, multiple output communications. The antenna 826 may include microstrip antennas, printed antennas fabricated on the surface of one or more printed circuit boards, patch antennas, phased array antennas, etc. The antenna 826 may have one or more panels designed for specific frequency bands including bands in FR1 or FR2.

The user interface circuitry 816 includes various input/output (I/O) devices designed to enable user interaction with the UE 800. The user interface 816 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1100.

The sensors 820 may include devices, modules, or subsystems whose purpose is to detect events or changes in its environment and send the information (sensor data about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasome transceivers; microphones or other like audio capture devices; etc.

The driver circuitry 822 may include software and hardware elements that operate to control particular devices that are embedded in the UE 800, attached to the UE 1100, or otherwise communicatively coupled with the UE 800. The driver circuitry 822 may include individual drivers allowing other components to interact with or control various input/output (I/O) devices that may be present within, or connected to, the UE 800. For example, driver circuitry 822 may include a display driver to control and allow access to a display device, a touchscreen driver to control and allow access to a touchscreen interface, sensor drivers to obtain sensor readings of sensor circuitry 820 and control and allow access to sensor circuitry 820, drivers to obtain actuator positions of electro-mechanic components or control and allow access to the electro-mechanic components, a camera driver to control and allow access to an embedded image capture device, audio drivers to control and allow access to one or more audio devices.

The PMIC 824 may manage power provided to various components of the UE 800. In particular, with respect to the processors 804, the PMIC 824 may control power-source selection, voltage scaling, battery charging, or DC-to-DC conversion.

In some embodiments, the PMIC 824 may control, or otherwise be part of, various power saving mechanisms of the UE 800 including DRX as discussed herein.

A battery 828 may power the UE 800, although in some examples the UE 800 may be mounted deployed in a fixed location, and may have a power supply coupled to an electrical grid. The battery 828 may be a lithium ion battery, a metal-air battery, such as a zinc-air battery, an aluminum-air battery, a lithium-air battery, and the like. In some implementations, such as in vehicle-based applications, the battery 828 may be a typical lead-acid automotive battery.

Figure 9:
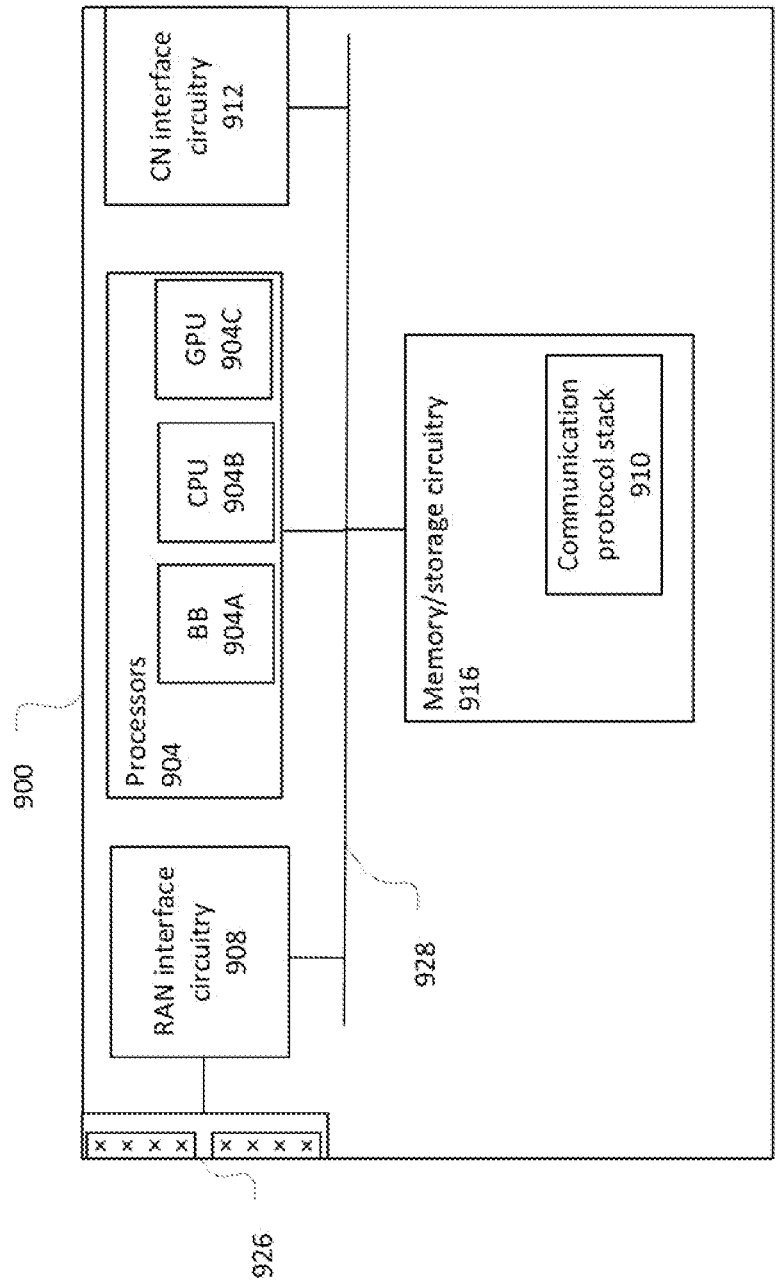
FIG. 9 illustrates a base station m accordance with some embodiments.

FIG. 9 illustrates a gNB 900 in accordance with some embodiments. The gNB node 900 may similar to and substantially interchangeable with base station 108 of FIG. 1.

The gNB 900 may include processors 904, RF interface circuitry 908, core network "CN" interface circuitry 912, memory/storage circuitry 916, and antenna structure 926.

The components of the gNB 900 may be coupled with various other components over one or more interconnects 928.

The processors 904, RF interface circuitry 908, memory storage circuitry 916 (including communication protocol stack 910), antenna structure 926, and interconnects 928 may be similar to like-named elements shown and described with respect to FIG. 10.

The CN interface circuitry 912 may provide connectivity to a core network, for example, a $5^{th}$ Generation Core network "5GC" using a 5GC-compatible network interface protocol such as carrier Ethernet protocols, or some other suitable protocol. Network connectivity may be provided to/from the gNB 900 via a fiber optic or wireless backhaul. The CN interface circuitry 912 may include one or more dedicated processors or FPGAs to communicate using one or more of the aforementioned protocols. In some implementations, the CN interface circuitry 912 may include multiple controllers to provide connectivity to other networks using the same or different protocols.

In some embodiments, the gNB 900 may be coupled with TRPs, such as TRPs 92 or 96, using the antenna structure 926, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should he clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method of operating a UE, the method comprising: receiving a first measurement object (MO) that is a candidate for measurement within a measurement gap; determining a $M_{inter}$ value based on a number of inter-frequency MOs that are candidates to be measured in the measurement gap, wherein the number of inter-frequency MOs include a first number of inter-frequency or inter-radio access technology (RAT) MOs that are configured by an evolved universal terrestrial radio access (E-UTRA) primary serving cell (PCell) and a second number of inter-frequency MOs that are configured by a new radio (NR) primary secondary serving cell (PSCell); determine a carrier-specific scaling factor (CSSF) based on the $M_{inter}$ value; and performing a measurement based on the first MO and the CSSF.

Example 2 may include the method of example 1 or some other example herein, further comprising: determining a $M_{intra}$ value based on a number of intra-frequency MOs that are configured on, serving carriers by the NR PSCell and are candidates to be measured in the measurement gap; and determining the CSSF based further on the $M_{intra}$ value.

Example 3 may include the method of example 1 or some other example herein, wherein the first number of inter-frequency or inter-RAT MOs configured by the E-UTRA PCell include a third number of NR inter-RAT MOs, a fourth number of E-UTRA MOs and a fifth number of UTRA MOs.

Example 4 may include the method of example 3 or some other example herein, wherein the third number of NR inter-RAT MOs include a sixth number of inter-RAT MOs on serving carriers and a seventh number of inter-RAT MOs on non-serving carriers.

Example 5 may include the method of example 1 or some other example herein, further comprising: performing, the first measurement in to first component carrier and performing the second measurement in a second component carrier.

Example 6 may include a method of operating a UE, the method comprising: storing merging criteria; determining, for a $M_{intra}$ value, a first number of intra-frequency measurement objects (MOs) or determining, for a value, a second number of inter-frequency measurement objects (MOs); calculating a carrier-specific scaling factor (CSSF) based on the value or the value, and performing, within a measurement gap, a measurement based on the CSSF and an MO, wherein to determine either the first number or the second number the processing circuitry is to determine whether a pair of MOs satisfy the merging criteria.

Example 7 may include the method of example 6 or some other example herein, wherein the pair of MOs include a first MO and a second MO and, to determining whether the pair of MOs satisfy the merging criteria comprises: determining that the first MO and the second MO identify common received signal strength (RSSI) measurement resources, deriveSSB-IndexFromCell indications, and synchronization signal block (SSB) measurement timing configuration (SMTC) configurations: determining that the pair of MOs satisfy the merging criteria based on said determination that the first MO and the second MO identify common RSSI measurement resources, deriveSSB-IndexFromCell indications, and SMTC configurations; and determining either the first number or the second number based on a count value of one for the pair of MOs based on the determination that the pair of MOs satisfy the merging criteria.

Example 8 may include the method of example 6 or some other example herein, wherein the pair of MOs include a first MO and a second MO and, determining whether the pair of MOs satisfy the merging criteria further comprises: determining that the first MO and the second MO identify different received signal strength (RSSI) measurement resources, deriveSSB-IndexFromCell indications, or synchronization signal block (SSB) measurement timing configuration (SMTC)configurations; determining that the pair of MOs do not satisfy the merging criteria based on said determination that the first MO and the second MO identify different RSSI measurement resources, deriveSSB-IndexFromCell indications, or SMTC configurations; and determining either the first number or the second number based on a count value of two for the pair of MOs based on the determination that the pair of MOs do not satisfy the merging criteria.

Example 9 may include the method of example 6 or some other example herein, wherein the first number is based on a third number of intra-frequency MOs that are configured on serving carriers by a new radio (NR) primary secondary serving cell (PSCell) and are candidates to be measured in the measurement gap.

Example 10 may include the method of example 6 or some other example herein, wherein the second number of inter-frequency MOs include a third number of inter-frequency or inter-radio access technology (RAT) MOs configured by an evolved—universal terrestrial radio access (E-UTRA) primary serving cell (PCell).

Example 11 may include the method of example 10 or some other example herein, wherein the third number of inter-frequency or inter-RAT MOs is based on a fourth number of NR inter-RAT MOs, a fifth number of E-UTRA MOs, and a sixth number of UTRA MOs.

Example 12 may include the method of example 11 or some other example herein, wherein the fourth number of NR inter-RAT MOs include a seventh number of inter-RAT MOs on serving carriers and an eighth number of inter-RAT MOs on non-serving carriers.

Example 13 may include the method of example 6 or some other example herein, wherein calculating the CSSF comprises: calculating the CSSF based on both the Minter value and the Mintra value if a measurement gap sharing scheme is equal sharing.

Example 14 may include the method of example 6 or some other example herein, wherein calculating the CSSF comprises: calculating the CSSF based on a number of carriers to be measured if a measurement gap sharing scheme is equal sharing among carriers.

Example 15 may include the method of example 6 or some other example herein, wherein calculating the CSSF comprises: calculating the CSSF based on the Minter value if the measurement gap sharing scheme is not equal sharing and the MO is an inter-frequency MO.

Example 16 may include the method of example 6 or some other example herein, wherein calculating the CSSF comprises: calculating the CSSF based on the Mintra value if the measurement gap sharing scheme is not equal sharing and the MO is an intra-frequency MO.

Example 17 may include a method of operating a first base station, the method comprising: receiving from a measurement object configuration from, or transmitting the measurement object configuration to, a second base station, wherein the first and second base station provide a user equipment (UE) with an evolved universal terrestrial radio access—new radio dual connectivity (EN-DC) connection, the measurement object configuration to restrict provision of a plurality of measurement object (MOs) to the UE for one frequency layer of a new radio (NR) cell; and providing a MO to the UE to configure the UE to perform a measurement on the frequency layer within a measurement gap.

Example 18 may include the method of example 17 or some other example herein, wherein; a type-1 MO is a measurement gap (MG)-based Ultra-frequency NR MO configured by NR primary secondary cell (PSCell) to perform a measurement in a serving carrier; a type-2 MO is an intra-frequency NR MO without measurement gap configured by NR PSCell and fully overlapped with a measurement gap to perform a measurement in a serving carrier; and a type-4 MO is an inter-radio access technology (RAT) configured by LTE PCell on a same frequency layer as a type 1 MO or a type-2 MO; and the measurement object configuration is to prevent provision of type-1 MO or a type-2 MO with a type-4 MO.

Example 19 may include the method of example 17 or some other example herein, wherein: a type-3 MO is an inter-frequency NR MO configured by NR PCell on a non-serving carrier; a type-5 MO is an inter-RAT NR MO configured by LTE PCell on same frequency layer as type 3; and the measurement object configuration is to prevent provision of a type-3 MO and a type-5 MO.

Example 20 may include the method of example 17 or some other example herein, wherein: a type-1 MO is a measurement gap (MG)-based intra-frequency NR MO configured by NR primary secondary cell (PSCell) for a serving carrier; a type-2 MO is an intra-frequency NR MO without measurement gap configured by NR PSCell and fully overlapped with a measurement gap for a serving carrier; a type-3 MO is an inter-frequency NR MO configured by NR PCell on a non-serving carrier; and the measurement object configuration is prevent an LTE PCell from configuring an inter-RAT NR measurement, wherein only an NR PSCell can Configure a type-1 MO, a type-2 MO, or a type-3 MO.

Example 21 may include the method of example 17 or some other example herein, wherein: a type-1 MO is a measurement gap (MG)-based intra-frequency NR MO configured by NR primary secondary cell (PSCell) for a serving carrier; a type-2 MO is an intra-frequency NR MO without measurement gap configured by NR PSCell and fully overlapped with a measurement gap for a serving carrier; a type-3 MO is an inter-frequency NR MO configured by NR PCell on a non-serving carrier; an LTE PCell configures an inter-RAT NR measurement, and the measurement object configuration is to prevent an NR PSCell from configuring a type-1 MO, a type-2 MO, or a type-3 MO.

Example 22 may include an apparatus comprising means to perform one or more elements of a method described in or related to any of examples 1-21, or any other method or process described herein.

Example 23 may include one or more non-transitory computer-readable media comprising instructions to cause an electronic device, upon execution of the instructions by one or more processors of the electronic device, to perform one or more elements of a method described in or related to any of examples 1-21, or any other method or process described herein.

Example 24 may include an apparatus comprising logic, modules, or circuitry to perform one or more elements of a method described in or related to any of examples 1-21, or any other method or process described herein.

Example 25 may include a method, technique, or process as described in or related to any of examples 1-21, or portions or parts thereof.

Example 26 may include an apparatus comprising: one or more processors and one or more computer-readable media comprising instructions that, when executed by the one or more processors, cause the one or more processors to perform the method, techniques, or process as described in or related to any of examples 1-21, or portions thereof.

Example 27 may include a signal as described in or related to any of examples 1-21, or portions or parts thereof.

Example 28 may include a datagram, information element, packet, frame, segment, PDU, or message as described in or related to any of examples 1-21, or portions or parts thereof, or otherwise described in the present disclosure.

Example 29 may include a signal encoded with data as described in or related to any of examples 1-21, or portions or parts thereof, or otherwise described in the present disclosure.

Example 30 may, include a signal encoded with a datagram, IE, packet, frame, segment, PDU, or message as described in or related to any of examples 1-21, or portions or parts thereof, or otherwise described in the present disclosure.

Example 31 may include an electromagnetic signal carrying, computer-readable instructions, wherein execution of the computer-readable instructions by one or more processors is to cause the one or more processors to perform the method, techniques, or process as described in or related to any of examples 1-21, or portions thereof.

Example 32 may include a computer program comprising instructions, wherein execution of the program by a processing element is to cause the processing element to carry out the method, techniques, or process as described in or related to any of examples 1-21, or portions thereof.

Example 33 may include a signal in a wireless network as shown and described herein.

Example 34 may include a method of communicating in a wireless network as shown and described herein.

Example 35 may include a system for providing wireless communication as shown and described herein.

Example 36 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise farm disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:
1. An apparatus comprising:
   processing circuitry to:
   determine an $M_{tot}$ value that represents a total number of measurement objects (MOs) that are candidates to be measured in a measurement gap;

calculate a carrier-specific scaling factor (CSSF) based at least in part on the $M_{total}$ value; and perform, within the measurement gap, a measurement based at least in part on the CSSF and an MO that is a candidate to be measured in the measurement gap, wherein; to determine the $M_{tot}$ value the processing circuitry is to determine whether a pair of MOs that are candidates to be measured within the measurement gap satisfy merging criteria; the pair of MOs are counted as one MO for the $M_{tot}$ value if they satisfy the merging criteria; and the pair of MOs are counted as two MOs for the $M_{tot}$ value if they do not satisfy the merging criteria; and interface circuitry to coupled with the processing circuitry to enable communication.

2. The apparatus of claim 1, wherein the pair of MOs include a first MO and a second MO and, to determine whether the pair of MOs satisfy the merging criteria, the processing circuitry is to:

determine that the first MO and the second MO identify common received signal strength (RSSI) measurement resources, deriveSSB-IndexFromCell indications, and synchronization signal block (SSB) measurement timing configuration (SMTC) configurations;

determine that the pair of MOs satisfy the merging criteria based at least in part on said determination that the first MO and the second MO identify common RSSI measurement resources, deriveSSB-IndexFromCell indications, and SMTC configurations; and determine the $M_{tot}$ Value based at least in part on a count value of one for the pair of MOs based at least in part on the determination that the pair of MOs satisfy the merging criteria.

3. The apparatus of claim 1, wherein the pair of MOs include a first MO and a second MO and, to determine whether the pair of MOs satisfy the merging criteria, the processing circuitry is further to:

determine that the first MO and the second MO identify different received signal strength (RSSI) measurement resources, deriveSSB-IndexFromCell indications, or synchronization signal block (SSB) measurement timing configuration (SMTC) configurations;

determine that the pair of MOs do not satisfy the merging criteria based at least in part on said determination that the first MO and the second MO identify different RSSI measurement resources, deriveSSB-IndexFromCell indications, or SMTC configurations; and determine the $M_{tot}$ value based at least in part on a count value of two for the pair of MOs based at least in part on the determination that the pair of MOs do not satisfy the merging criteria.

4. The apparatus of claim 1, wherein the processing circuitry is further to:

determine an $M_{inter}$ value based at least in part on a number of intra-frequency MOs that are configured on serving carriers by a new radio (NR) primary secondary serving cell (PSCell) and are candidates to be measured in the measurement gap; and determine the $M_{tot}$ value based at least in part on the $M_{inter}$ Value.

5. The apparatus of claim 1, wherein the processing circuitry is further to:

determine an $M_{intra}$ value based at least in part on a number of inter-frequency or inter-radio access technology (RAT) MOs configured by an evolved-universal terrestrial radio access (E-UTRA) primary serving cell (PCell); and determine the $M_{tot}$ value based at least in part on the $M_{intra}$ Value.

6. The apparatus of claim 5, wherein the processing circuitry is to determine $M_{intra}$ value based a number of NR inter-RAT MOs, a number of E-UTRA MOs, and a number of UTRA MOs.

7. The apparatus of claim 6, wherein the number of NR inter-RAT MOs includes inter-RAT MOs on serving carriers and inter-RAT MOs on non-serving carriers.

8. The apparatus of claim 1, wherein the processing circuitry is further to:

determine an $M_{inter}$ value that represents a number of intra-frequency MOs that are candidates to be measured in the measurement gap;

determine an $M_{intra}$ value that represents a number of inter-frequency MOs and inter-radio access technology (RAT) MOs that are candidates to be measured in the measurement gap; and determine the $M_{tot}$ value based at least in part on the $M_{inter}$ value and the $M_{intra}$ value.

9. The apparatus of claim 1, wherein to calculate the CSSF the processing circuitry is further to:

calculate the CSSF based at least in part on a number of carriers to be measured if a measurement gap sharing scheme is equal sharing among carriers.

10. The apparatus of claim 1, wherein the pair of MOs are on the same frequency layer.

11. The apparatus of claim 8, wherein to calculate the CSSF the processing circuitry is further to:

calculate the CSSF based at least in part on the $M_{intra}$ value if a measurement gap sharing scheme is not equal sharing and the MO is an intra-frequency MO.

12. A method of operating a first base station or a component to be implemented in a first base station, the method comprising:

receiving a measurement object configuration from, or transmitting a measurement object configuration to, a second base station, wherein the first and second base station provide a user equipment (UE) with an evolved universal terrestrial radio access-new radio dual connectivity (EN-DC) connection, the measurement object configuration to restrict provision of a plurality of measurement object (MOs) to the UE for one frequency layer of a new radio (NR) cell; and providing a MO to the UE to configure the UE to perform a measurement on the frequency layer within a measurement gap, wherein a type-3 MO is an inter-frequency NR MO configured by NR primary cell (PCell) on a non-serving carrier; a type-5 MO is an inter-radio access technology (RAT) NR MO configured by Long Term Evolution (LTE) PCell on a same frequency layer as type 3; and the measurement object configuration is to prevent provision of a type-3 MO and a type-5 MO.

13. The method of claim 12, wherein: a type-1 MO is a measurement gap (MG)-based intra-frequency NR MO configured by NR primary secondary cell (PSCell) to perform a measurement in a serving carrier; a type-2 MO is an intra-frequency NR MO without measurement gap configured by NR PSCell and fully overlapped with a measurement gap to perform a measurement in a serving carrier; and a type-4 MO is an inter-radio access technology (RAT) configured by LTE PCell on a same frequency layer as a type 1 MO or a type-2 MO; and the measurement object configuration is to prevent provision of type-1 MO or a type-2 MO with a type-4 MO.

14. The method of claim 12, wherein: a type-1 MO is a measurement gap (MG)-based intra-frequency NR MO configured by NR primary secondary cell (PSCell) for a serving carrier; a type-2 MO is an intra-frequency NR MO without measurement gap configured by NR PSCell and fully overlapped with a measurement gap for a serving carrier; a type-3 MO is an inter-frequency NR MO configured by NR PCell on a non-serving carrier; and the measurement object configuration is prevent an LTE PCell from configuring an inter-RAT NR measurement, wherein only an NR PSCell can configure a type-1 MO, a type-2 MO, or a type-3 MO.

15. A method comprising:
identifying a plurality of measurement objects (MOs) that are candidates to be measured in a measurement gap; and
performing, within a period, one or more measurements based at least in part on at least one MO of the plurality of MOs,
wherein the period is associated with a carrier-specific scaling factor (CSSF) that is based at least in part on an $M_{tot}$ value that represents a total number of the plurality of MOs that are candidates to be measured in a measurement gap,
wherein two or more MOs that are candidates to be measured in the measurement gap are counted as one for the $M_{tot}$ value if they satisfy a merging criteria and are counted as two for the $M_{tot}$ value if they do not satisfy the merging criteria.

16. The method of claim 15, wherein the plurality of MOs includes at least one inter-radio access technology (RAT) MO.

17. The method of claim 15, wherein:
the two or more MOs include a first MO and a second MO; and
the two or more MOs satisfy the merging criteria and count as one for the $M_{tot}$ value if the first MO and the second MO identify common received signal strength (RSSI) measurement resources, deriveSSB-IndexFromCell indications, and synchronization signal block (SSB) measurement timing configuration (SMTC) configurations.

18. The method of claim 15, wherein:
the two or more MOs include a first MO and a second MO; and
the two or more MOs do not satisfy the merging criteria and count as at least two for the $M_{tot}$ value if the first MO and the second MO identify different received signal strength (RSSI) measurement resources, deriveSSB-IndexFromCell indications, or synchronization signal block (SSB) measurement timing configuration (SMTC) configurations.

19. The method of claim 15, wherein a first MO of the two or more MOs is on a serving carrier and is configured by a new radio (NR) primary secondary serving cell (PSCell), and a second MO of the two or more MOs is on the serving carrier and is a new radio (NR) inter-radio access technology (RAT) MO configured by an evolved-universal terrestrial radio access (E-UTRA) primary serving cell (PCell).

20. The method of claim 15, wherein the two or more MOs are on a same frequency layer.

* * * * *